(12) United States Patent
Sanz-Pastor et al.

(10) Patent No.: US 8,005,713 B1
(45) Date of Patent: Aug. 23, 2011

(54) INTERACTIVE ADVERTISING WITH AN AUTOMATED VIEWING REWARD SYSTEM

(75) Inventors: Ignacio Sanz-Pastor, San Francisco, CA (US); David L Morgan, III, Redwood City, CA (US); Christopher E Blumenthal, Scotts Valley, CA (US)

(73) Assignee: Aechelon Technology, Inc., San Francisco, CA (US)

( * ) Notice: Subject to any disclaimer, the term of this patent is extended or adjusted under 35 U.S.C. 154(b) by 1266 days.

(21) Appl. No.: 10/007,966

(22) Filed: Nov. 7, 2001

Related U.S. Application Data

(60) Provisional application No. 60/247,473, filed on Nov. 8, 2000.

(51) Int. Cl.
*G06Q 30/00* (2006.01)
(52) U.S. Cl. ...................................................... 705/14.1
(58) Field of Classification Search .................... 705/14, 705/14.1
See application file for complete search history.

(56) References Cited

U.S. PATENT DOCUMENTS

| | | | | |
|---|---|---|---|---|
| 5,532,735 | A * | 7/1996 | Blahut et al. ..................... | 725/32 |
| 6,313,732 | B1 * | 11/2001 | DeLuca et al. .................. | 340/7.2 |
| 2001/0044741 | A1 * | 11/2001 | Jacobs et al. ..................... | 705/14 |

OTHER PUBLICATIONS

My Points, Home Page [online] [retrieved on Apr. 26, 2002]. Retrieved from the Internet: <URL: http://www.mypoints.com.
Real, Home Page [online] [retrieved on Apr. 26, 2002]. Retrieved from the Internet: <URL: http://www.real.com.
Atom Films, Home Page [online] [retrieved on Apr. 26, 2002]. Retrieved from the Internet: <URL: http://atomfilms.shockwave.com/af/home/.
ifilm, Home Page [online] [retrieved on Apr. 26, 2002]. Retrieved from the Internet: <URL: http://www.ifilm.com/.
Yahoo! Broadcast, Home Page [online] [retrieved on Apr. 26, 2002]. Retrieved from the Internet: <URL: http://broadcast.yahoo.com/home.html.

* cited by examiner

*Primary Examiner* — Daniel Lastra
(74) *Attorney, Agent, or Firm* — Fenwick & West LLP

(57) ABSTRACT

Programming is provided to a user. The programming includes content that the user wishes to play, and may also contain advertising. More specifically, the user controls various aspects of the advertising and earns value in return for agreeing to or allowing certain advertising actions. For example, in one embodiment, the programming contains blocks of advertising that separate blocks of streaming content, similar to current television advertising. The user pays a subscription fee for the streaming content. The user also has the power to determine which advertisements (or blocks of advertisements) that the user wishes to view. For example, the user may have a remote control with a "skip advertisement" button. Each advertisement has a value associated with it, and by viewing that advertisement, the user earns credits against the user's subscription fee.

22 Claims, 5 Drawing Sheets

US 8,005,713 B1

INTERACTIVE ADVERTISING WITH AN AUTOMATED VIEWING REWARD SYSTEM

CROSS-REFERENCE TO RELATED APPLICATION

This application claims priority under 35 U.S.C. §119(e) to U.S. Provisional Patent Application Ser. No. 60/247,473, "Interactive Advertising With an Automated Viewing Reward System," by Ignacio Sanz-Pastor, David L. Morgan III and Christopher E. Blumenthal, filed Nov. 8, 2000. The subject matter of the foregoing is incorporated herein by reference in its entirety.

BACKGROUND OF THE INVENTION

1. Field of the Invention

This invention relates to content delivery systems and advertising management on such content delivery systems.

2. Description of the Related Art

Advertising in traditional content delivery systems, such as radio and television, has existed since the inception of these media as a viable mass-market business. Advertisers and radio and television networks routinely collect data on program and advertisement viewing, using such services as the Nielsen rating system. The collected data is used to determine statistics, which in turn are used as an aid to target advertising to the most appropriate audience. Basically, the statistics are used to develop demographic profiles for television and radio programs, and advertisers then buy advertising time on the programs likely to be watched by the advertiser's targeted audiences. However, in this approach, there is no immediate feedback concerning the effectiveness of any advertisement, nor is there any direct interaction with the intended audience.

However, new technological advances are challenging the traditional advertising model. For example, television hard disk recorders, such as those marketed by Tivo and ReplayTV, allow viewers to manipulate the manner in which they receive and view commercial television broadcasts, including truncating and skipping advertisements. This capability challenges the current content distribution model of free or small monthly fee based television broadcasting sustained by paid advertising, by changing passive viewers into active viewers who can skip and reject commercials at will, thus redefining the value of the entire programming grid and "prime time" television and making audience metering significantly harder. Channel proliferation is also making it harder and harder for advertisers to reach their desired targets, increasing the cost of delivering a given message to a demographic subset of the audience.

Furthermore, the Internet and the World Wide Web have created new types of media and media delivery systems. The new media has resulted in a need for new types of advertising. For example, on the World Wide Web, advertising banners are commonly presented along with information in web pages, and by clicking on the banner the user may direct its browser to relocate to the advertiser's website. Banner ads, however, are generally acknowledged to have less impact than television ads because of the limited ability of a banner ad to tell a story.

Furthermore, some web sites such as mypoints.com allow site visitors to earn value by clicking on banner ads, joining certain mailing lists or groups, or activating other marketing opportunities while at the site. However, these web sites generally do not have compelling content like movies, music or short animations provided at or through the site. Rather, visitors come to the site primarily to activate the ads and other marketing gimmicks in exchange for earning value. This is different from traditional media such as broadcast television where viewers tune in primarily to enjoy the content provided and the advertising is secondary in importance.

It is also generally acknowledged that traditional types of advertising are riot appropriate for the Internet and World Wide Web, in part because they do not take advantage of the interactive capability of the new technology. For example, the two-way interactive nature of the Internet allows advertisers to compile statistics on individual users and/or networks and to track the use and effectiveness of advertisements. This data can be used to increase the effectiveness of advertisements and to more precisely target advertisements to particular groups. Traditional advertising does not take advantage of these advances.

Moreover, advances in compression technology allow the creation of new forms of content delivery systems that are approaching the quality and capabilities of traditional media, such as TV and radio. Examples of such systems include the Hughes DirecTV satellite television system, the TCI digital cable television infrastructure, and the transmission of audio files as MP3 encoded data over the Internet for Internet radio applications. However, unlike traditional television and radio, these new systems transmit digital data. The digital nature of these content delivery systems, when coupled with an infrastructure capable of two-way communication such as cable or the Internet, enables applications that extend media from a broadcasting paradigm into an interactive paradigm. Examples of this new kind of application include Real Network's Real Player and Microsoft's Media Player with streaming video capabilities, which have enabled media playback for thousands of web sites, and which are starting to evolve into fully interactive content delivery networks, such as Real's website www.real.com, Atom Film's website www.atomfilms.com, Ifilm (www.ifilm.com) and Yahoo's www.broadcast.com. These new ventures are trying to use a combination of subscription fees and paid advertising in the form of short commercials attached to each video segment played by the user, but are still significantly limited by the quality and bandwidth of the current global Internet infrastructure, and are focused in small segments to be viewed in a computer, as opposed to a more general entertainment network to be viewed on a television screen.

On the animation side, Macromedia's Flash player has received significant recognition as a 2D animation standard for the web. Macromedia's content site, Shockwave.com, is another example of how the combination of interaction, content and the Internet are creating new platforms for media delivery. Companies such as Pulse 3D and Shout Interactive are attempting to create 3D graphics equivalents of the Flash player in order to enable similar experiences for 3D graphics rendering. In the animation websites, most of the advertising is still limited to banners and loading screens, but there is a rapidly evolving infrastructure for content playback that advertising will no doubt try to leverage in the near future.

Thus, there is a need for approaches that enable effective advertising over digital content delivery networks. In particular, there is a need for advertising that is compelling for the user and also takes advantage of the recent advances in interactivity and data collection.

SUMMARY OF THE INVENTION

The present invention overcomes the limitations of the prior art by providing interactive advertising. Programming, which includes content and advertisements, is provided to a user. The user controls one or more aspects of the playing of the advertisements and earns value accordingly.

For example, in one embodiment, the content and advertisements are streamed to the user over a network (e.g., over the Internet to a game console). The user pays a periodic fee for the service that provides the content, and/or a specific fee to receive particular content. The user also determines which advertisements he wishes to play. For example, advertisements may be played automatically unless the user indicates a desire to skip the advertisement. Alternately, the user may specify that advertisements be automatically skipped unless the user indicates a desire to play a specific advertisement. In a final example, the user defines criteria which are used to determine whether to skip or play an advertisement. Each advertisement has a value associated with it, and by allowing an advertisement to play, the user earns an abatement of his fees for service or content delivery. The foregoing is in contrast to the background art. In approaches such as traditional broadcast television, video tapes and the like, the user has no control over the programming other than to completely interrupt transmission. In approaches such as mypoints.com, the user interacts primarily with advertisements that are presented for review, such as Internet based banner ads, and must take specific actions (e.g., selecting by a click of a mouse or other cursor control device) to interact with each advertisement.

In another aspect of the invention, statistics on the user's viewing habits are collected (e.g., by collecting statistics on which advertisements are played by the user). These statistics are used to target advertisements to the user. For example, users can be clustered into groups based on their statistics and advertisements targeted to a specific user based on his corresponding group. In one implementation, users are clustered into demographic groups.

Other aspects of the invention include systems and software for implementing the functionality described above.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
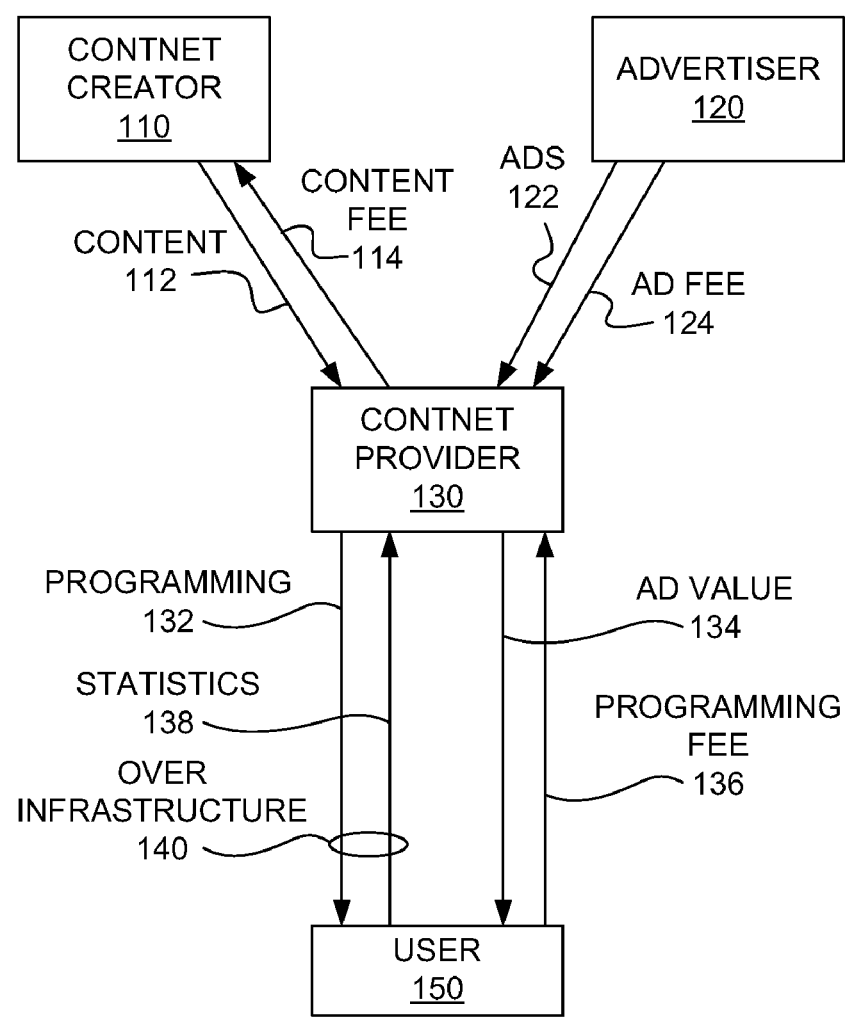
FIG. 1 is a block diagram of a system according to the present invention.

FIG. 1 is a block diagram of a system 100 according to the present invention. System 100 includes a content creator 110, advertiser 120, content provider 130 and user 150. Content provider 130 is connected to user 150 by communications infrastructure 140. Each of these entities 110-150 may be an individual, a group of individuals, a legal entity such as a corporation, a computer or other logic-based device, or the like. Furthermore, in FIG. 1, each block 110-150 represents a specific role played within system 100. However, this does not imply that separate devices or entities are required for each block, or that the role specified by each block is accomplished by a single device or entity. For example, a single entity such as AOL might play the roles of both content creator 110 and content provider 130. As another example, the role of content provider 130 might be divided among multiple entities. Further examples will be given below.

The content creator 110 generates content that eventually will be distributed to user 150 via infrastructure 140. While content can take many forms, some common examples of content include television shows, episodic series, movies and short films, animation short films and movies, television news, documentaries, songs, and musical performances. Content creators are as varied as the content that they create, but examples includes television production operations that create episodic series for television syndication; movie production studios that license their movies for theatrical, television, video tape or internet distribution; animation studios that create animated series for television, theatrical, video tape or internet release; and musicians and music companies that license music for playback in radio, television or internet playback.

Similarly, advertiser 120 produces advertising, which advertiser 120 would like user 150 to view. Examples of advertising include television commercials, program previews and "teasers" or short segments to motivate the viewing of future commercials.

Content provider 130 provides programming 132 to user 150 over infrastructure 140. For example, content provider 130 may broadcast programming to user 150 at a predetermined time. Alternately, programming may be sent on-demand when the user selects from a menu of possible programs. The programming includes content that user 150 wishes to access and may also include advertising. The term "content provider" is a general term used to refer to any entity or combination of entities that provide this service. The service itself may be implemented in many ways by many different types of entities. For example, in FIG. 1, the content portion 112 of the programming is purchased by content provider 130 from content creator 110 in exchange for fees 114. The advertising portion 122 is received by content provider from advertiser 120, in exchange for payment of fees 124 from advertiser 120 to content provider 130. Examples of content providers include broadcast and cable television networks, theater chains and radio stations, and in the internet market, entertainment websites such as atomfilms.com or ifilm.com.

The examples in this description shall be described in the context of "paying fees," but it is to be understood that other types of value could also be exchanged. For example, value could be provided in the form of promotional product offers, or reduction of service fees for complementary services, such as network ISP fees or free access to pay-per-view content. Similarly, the examples shall also be described in the context of "viewing" or "playing" advertisements or content, but it is to be understood that these terms are meant to include other types of access. For example, fees may be assessed on the basis of recording or copying content instead.

In one specific embodiment, content delivery is based on the integration of multiple content delivery systems into a single delivery stream. In this particular embodiment, a content delivery company integrates digital content from multiple sources, such as servers from different content providers and advertising content from advertising server(s), into a single, unified programming stream that reaches the end user. In this case, the content deliverer acts as an aggregator of content from other content delivery sources.

Infrastructure 140 may also take various forms. In a preferred embodiment, infrastructure 140 is the Internet or a private network subset thereof (e.g., a virtual private network), and content provider 130 delivers its programming by streaming content over the Internet to user 150, who accesses the Internet using a web browser. In alternate embodiments, infrastructure 140 is physical media such as CDs, DVDs, memory cards or data cartridges. In another embodiment, infrastructure 140 is based on the broadcast of digital television signals. Content and advertisements may be delivered using different infrastructure.

User 150 may access infrastructure 140 using many different types of access devices. For example, user 150 may use a console game system to access a proprietary network (e.g., Sony Playstation II accessing the Sony interactive game network); a personal computer, computer workstation, or other type of computer to access the Internet; a set-top box or personal TV recorder (e.g., TiVo or ReplayTV) to access the television broadcast system, or a television or DVD player set with analogous functions; or a personal digital assistant (e.g., Palm Pilot) to access a wireless network. Other combinations will be apparent. Referring again to FIG. 1, as mentioned previously, programming 132 may contain advertising 122. More specifically, user 150 controls various aspects of the advertising that user 150 receives and earns value 134 in return for agreeing to or allowing certain advertising actions. For example, in one embodiment, the programming 132 contains blocks of advertising 122 that separate blocks of streaming content 112, similar to current television advertising. However, user 150 has the power to determine which advertisements (or blocks of advertisements) user 150 wishes to play. Each advertisement, in turn, has a value associated with it and by playing that advertisement, user 150 earns the corresponding value 134. In a preferred embodiment, the programming 132 is available on a subscription basis 136, for example monthly access fee or pay per view. By watching advertisements, the user 150 earns credits 134 against the subscription fees 136 of user 150.

Many other alternatives will be apparent. For example, in one approach, the user 150 determines in real-time whether to view an advertisement, for example by selecting to play an advertisement as it begins to appear (if the default is to skip advertisements) or by selecting to skip an advertisement as it begins to appear (if the default is to play advertisements). The selection may be made via devices such as a remote control, joystick, mousepad, console game system controller, or other type of input device. The user 150 may also change the default of whether advertisements are played or skipped. In another approach, the user 150 determines in advance which advertisements user 150 wishes to play. For example, user 150 might program his access device to show (or skip) advertisements based on the subject matter of the advertisement, the subject matter of the content, in order to earn certain levels of value, or any other types of criteria, such as parental blocking controls for a given age group. Alternately, rather than programming his access device, the user 150 might give instructions to content provider 130.

The basis for the earned value 134 may also differ. For example, rather than earning value based on which advertisements are played. User 150 might earn value based on when or how the advertisement is played. For example, if the user 150 requests that advertisements be accumulated into a single, long block (as is done on public television) rather than smaller, interspersed blocks (as is done on the major broadcasting networks), the value earned may change. Alternately, the value of an advertisement might depend on when the advertisement is played or whether the advertisement is played with other similar advertisements. The value may also be prorated depending on the amount of the advertisement played, for example if user 150 decides to skip an advertisement part way through the commercial. The value may also depend on how long the user 150 views the commercial, for example if user 150 pauses, slow motions, or repeatedly replays an advertisement.

The earned value 134 itself may also take many different forms. For example, rather than receiving a credit against subscription fees, user 150 may be paid (i.e., receive cash compensation) for playing advertisements. Alternately, user 150 might have to pay in order to skip advertisements. Also, caps may be placed on any of these amounts.

As a final example, different options might apply to different advertisements. For example, user 150 may not have the option to skip advertisements for content provider 130. As another example, if user 150 skips an advertisement, a small segment of the advertisement (e.g., a tail) or an abbreviated version of the advertisement might still be shown.

Referring again to FIG. 1, statistics 138 about user 150's viewing habits may also be collected. Based on these statistics, advertisements may be targeted to user 150. For example, in one embodiment, any of several advertisements might be shown in a specific advertising slot, and the actual advertisement to be shown is selected based on statistics about which advertisements user 150 prefers, determined by the interaction of user 150 with other advertising shown in the past. In an alternate embodiment, some or all of the statistics are stored locally on user 150's access device, rather than transmitting all data for storage by content provider 130.

In a preferred embodiment, statistics 138 are collected about which advertisements user 150 plays. The collected statistics are used to cluster users into groups and advertising is targeted to user 150 based on which groups user 150 clusters into. In a preferred embodiment, a user's group(s) is determined by identifying which groups are relevant to each advertisement. User 150 has a value associated for each such group. If a user 150 plays an advertisement, the values for the corresponding groups are increased. If a user 150 skips an advertisement, then the values for the corresponding groups are decreased. The values are adjusted according to the total advertisement time played and then used to determine the relevant groups for the user, according to a table of value ranges for each profile. In one embodiment, the groups are demographic groups.

The fees 124 paid by advertiser for its advertisements may also vary depending on any of the above factors. For example, if user 150 decides to view only car advertisements, the fee for car advertisements would increase if this were taken as an indication that user 150 is interested in purchasing a car in the near future. As another example, if statistics are used to target user 150, the fee for these targeted advertisements should be higher than untargeted advertisements.

FIGS. 2-5 illustrate a preferred embodiment in which the content is a compressed, streamed movie, for example ToyStory, the infrastructure 140 is the Internet, and user 150 accesses the Internet via a network enabled personal computer. The personal computer further includes software that supports streamed playback of the movie. This example is used to illustrate certain aspects of the invention but is not meant to limit the invention. For example, in an alternate embodiment, the content could be audio clips, infrastructure 140 could be a private subset of the Internet (such as @Home's broadband subset of the Internet), and user 150 could access the Internet via a network enabled game console (such as Sony's PlayStation II or Microsoft's Xbox).

Figure 2:
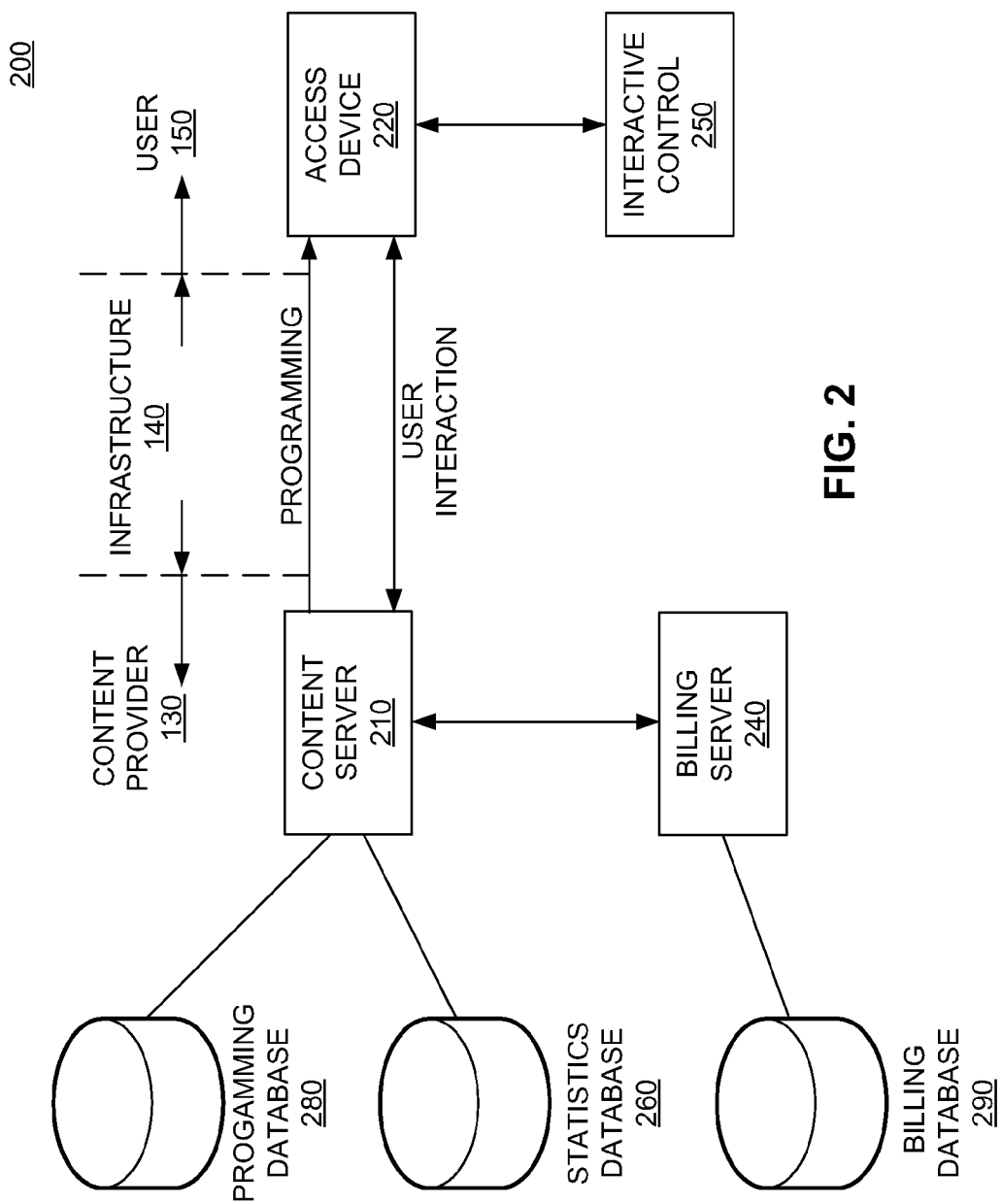
FIG. 2 is a block diagram illustrating a preferred architecture for the content provider and user portions of the system of FIG. 1.

FIG. 2 is a block diagram illustrating a preferred architecture 200 for the content provider 130 and user 150 portions of system 100. In architecture 200, the content provider 130 includes two servers (content server 210 and billing server 240) and three databases (programming database 280, statistics database 260 and billing database 290). The two servers 210 and 240 communicate with each other and can access the relevant databases 260, 280 and 290. In the example of FIG. 2, content server 210 accesses programming database 280 and statistics database 260, whereas billing server 240 accesses billing database 290. Content server 210 could be based on streaming media video or audio server software that accepts real time requests, such as Kasenna's MediaBase or Real's RealServer. The databases 260, 280 and 290 are preferably based on standard database applications, such as are available from Oracle or Informix.

User 150 includes an access device 220, such as a personal computer or networked video game console, coupled to an interactive control 250, such as a joystick, remote control or mouse. In a preferred embodiment, the access device 220. The interactive control 250 allows the user 250 to interact with the system, including for functions such as requesting particular content and/or selecting options for viewing advertisements.

Content server 210 communicates with access device 220 over the Internet 140 in order to establish communication between content provider 130 and user 150. The access device 220 and content server 210 preferably have a client-server relationship.

Figure 3:
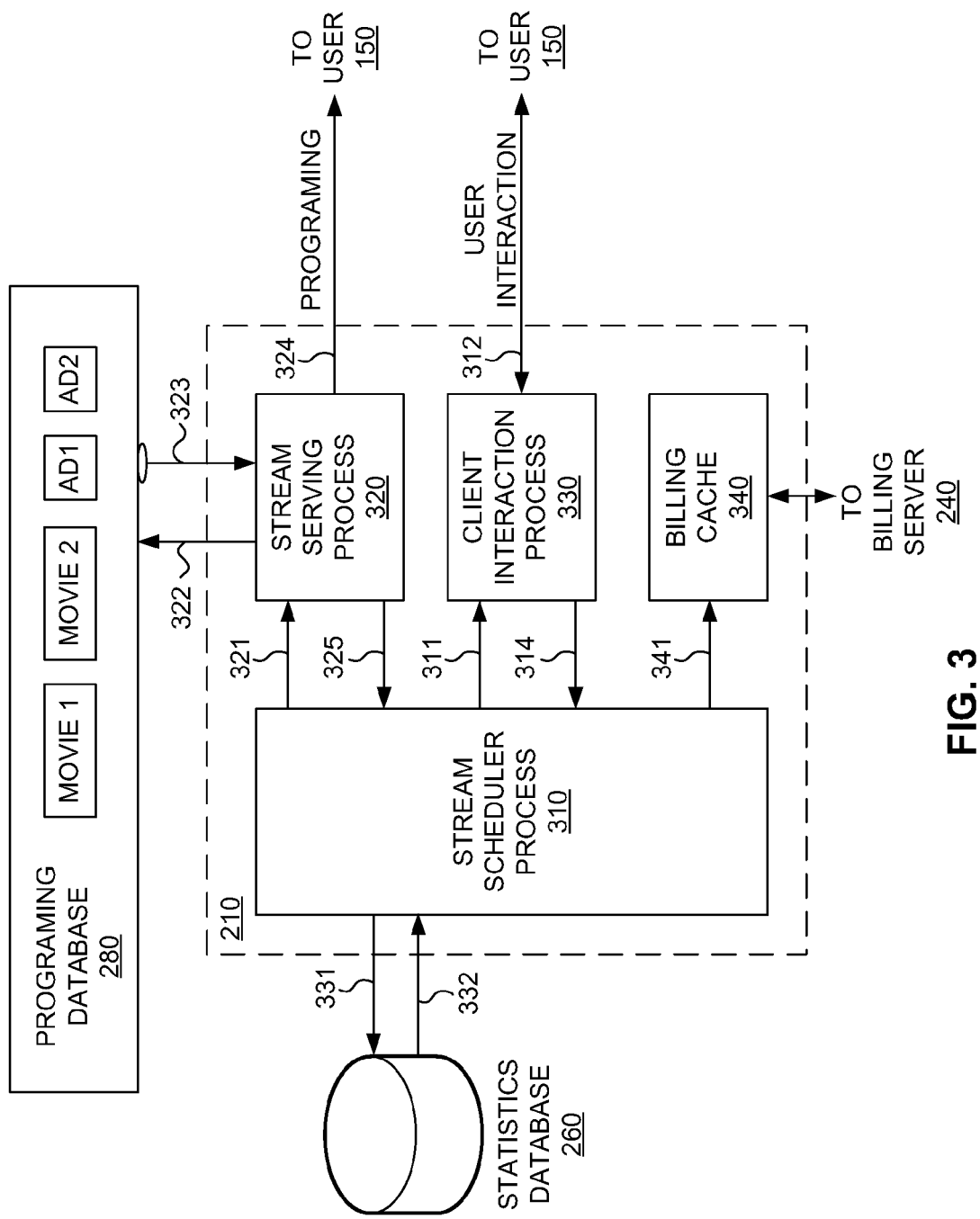
FIG. 3 is a block diagram further illustrating portions of the content provider of FIG. 2.

FIG. 3 is a block diagram further illustrating portions of content provider 130. Content server 210 includes three software processes: the stream scheduler process 310, the program stream serving process 320 and the client interaction process 330. The content server 210 also includes a billing cache 340, for interfacing with the billing server 240 and billing database 290. The stream scheduler process 310 manages the overall functionality of the content server 210 and interfaces with the other processes 320 and 330, and also with the storage modules 260, 280 and 340. The stream serving process 320 is responsible primarily for sending 324 programming to user 150. The client interaction process 330 is responsible primarily for interactions 312 between content provider 130 and user 150.

Consider first the generation of programming for user 150. Programming database 280 stores content and advertisements, preferably in a digital compressed format. For example, FIG. 3 shows two movies and two advertisements in database 280, which obviously is simplified for illustrative purposes. Stream scheduler process 310 first informs 311,312 the user 150, via client interaction process 330, what content is available. When user 150 requests 312 certain content, the stream scheduler process 310 receives 314 this request via client interaction process 330. The stream scheduler process 310 processes this request and sends 321 corresponding programming requests to stream serving process 320. In response to these requests, stream serving process 320 interacts 322, 323 with programming database 280 in order to stream 324 the appropriate programming over infrastructure 140 to the access device 220. The stream serving process 320 also collects data about bandwidth use and data transport infrastructure status and performance. This data is forwarded 325 to stream scheduler process 310 so that it may make corresponding adjustments.

As an example, in FIG. 3, stream scheduler process 310 might send 311 the availability of movies 1 and 2 to client interaction process 330, which sends 312 this information to user 150. Assume that user 150 requests movie1 and opts to view all advertisements. Stream scheduler process 310 receives 312, 314 these elections via client interaction process 330 and schedules periodic advertisement breaks into the content stream. Stream serving process 320 may be instructed 321 to send a portion of movie1 to user 150, followed by advertisements 1 and 2 before resuming the rest of movie1. Stream serving process 320 handles the actual streaming of programming to user 150. In an alternate embodiment, the stream serving process 320 broadcasts programming to many users.

The client interaction process 330 is the primary means for interaction between the content provider 130 and user 150. The client interaction process 330 typically receives 312 commands issued by the user 150 (e.g., selection of content, advertising viewing options and stream commands such as fast forward or pause). Data sent 312 by the client interaction process 330 to the user 150 typically includes information concerning available content. Billing, stream control tokens to identify the location of advertising within a programming segment, status and control data for system and stream management, transport and display performance metrics and other administrative/control information may also be sent 312 between the client interaction process 330 and user 150.

The stream scheduler process 310 also generates 331 statistics for the statistics database 260. Information stored for users 150 in database 260 includes the user's identification code, the user's relevant target groups, total content and/or advertising time viewed per billing period, number of advertisements seen and number of advertisements skipped. For each advertisement, a total count for played and skipped user per target group is stored as well. This information can then be used 332 to target advertising to user 150.

The stream scheduler process 310 also sends 341 billing information to the billing cache 340, in the faun of the user's identification code and credit earned for playing advertisements. Periodically, the billing server 240 polls the billing cache 340 to update the billing database 290. The billing database 290 stores billing information for user 150, including credits generated by advertisements. This data is reflected on each user's periodic bill.

Figure 4:
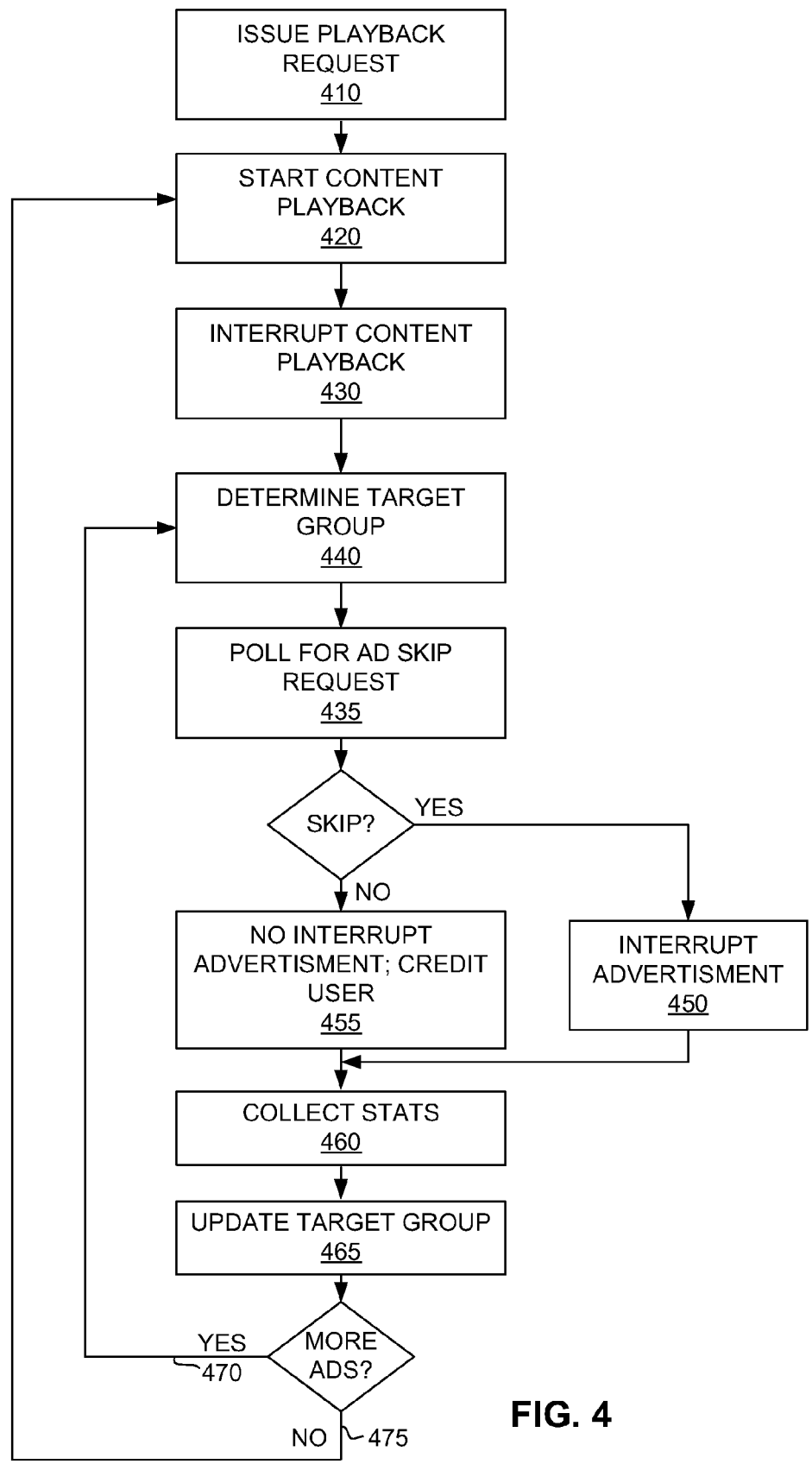
FIG. 4 is a flow diagram illustrating operation of the system of FIGS. 1-3.
Figure 5:
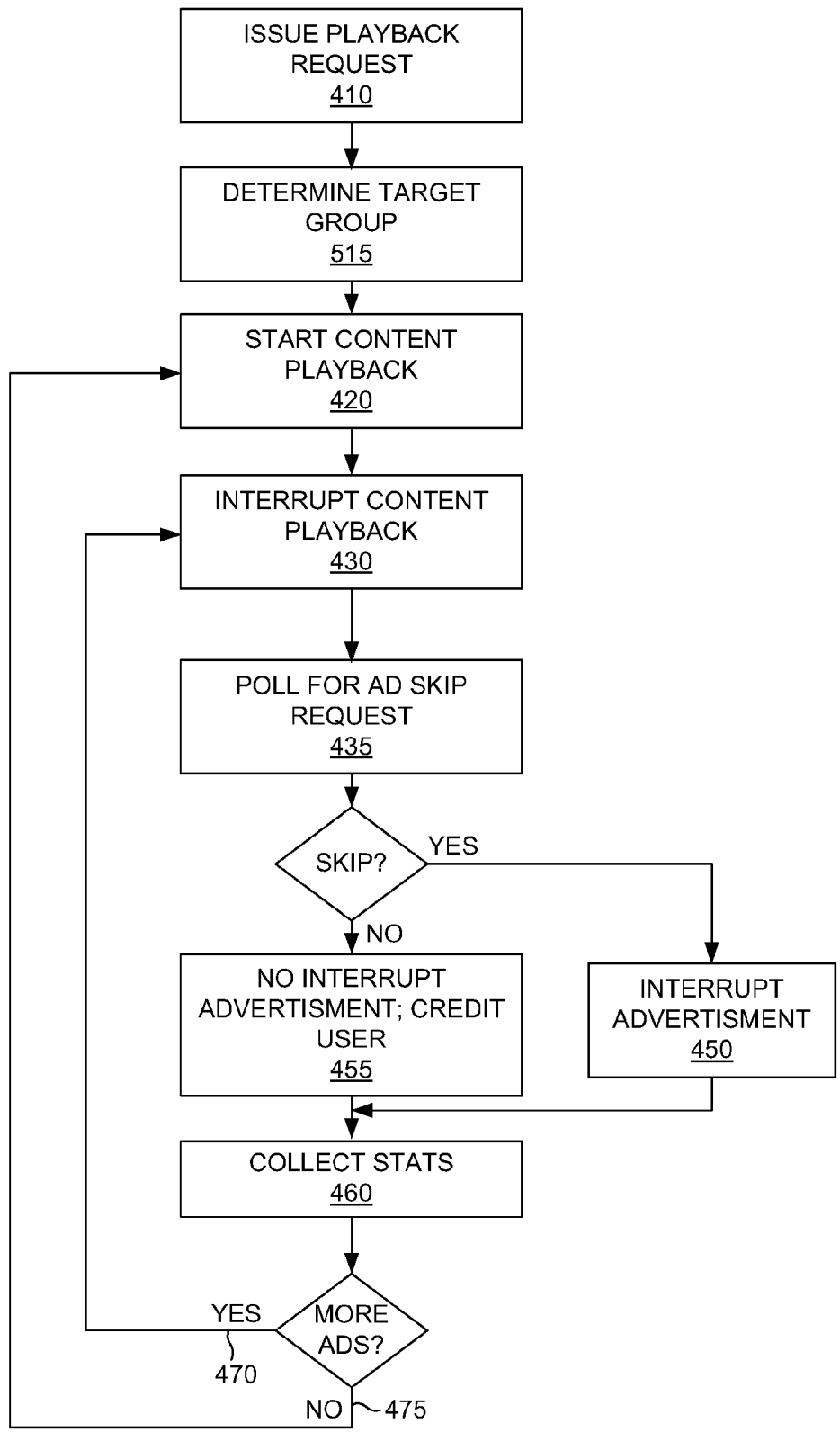
FIG. 5 is a flow diagram illustrating another aspect of operation of the system of FIGS. 1-3.

FIGS. 4-5 are flow diagrams illustrating operation of system 200. In FIG. 4, the user 150's target group is recomputed as each advertisement is played or skipped. In FIG. 5, the target group is computed at the beginning of the playback session. This is appropriate for certain situations because computing the user 150's target group may be computationally intensive.

Referring first to FIG. 4, the user 150 selects a content segment for playback and the client access device 220 issues 410 a playback request to the content server 210. The content server 210 identifies the required stream in the programming database 280 and starts 420 content stream playback. At the appropriate time, the stream scheduler process 310 issues 430 a stream interrupt command in order to insert a block of advertisements. The stream scheduler process 310 determines 440 the user 150's target group according to data in the statistics database 260 and selects an advertising block accordingly.

The access device 220 polls 435 the interactive control 250 to determine whether an advertising skip request had been made by the user 150. If the user 150 has elected to skip the advertising, then playback of the advertisement is interrupted 450 and, if called for, an advertising tail segment is shown 450 instead. If advertising is not skipped, then playback of the advertisement is not interrupted 455 and the advertisement is shown. The user 150's account is also credited 455 for playing the advertisement. Regardless of whether the advertisement was skipped, data and statistics for the advertisement and user 150 are collected 460, and the user 150's target group is updated 465.

This process is repeated 470 for the entire advertising block. At the end of the advertising block, the content server 210 resumes 475 playback of the requested content.

The process shown in FIG. 5 is the same as that shown in FIG. 4, except for the following. In FIG. 4, the user 150's target group was updated 465 on the fly as each advertisement was either selected or skipped. In FIG. 5, this does not happen. Instead, the user 150's target group is determined 515 at the beginning of playback of the content. It then remains static for the entire playback of the content and is updated only after playback is completed. In an alternative, the target group is static during each block of advertisements, but is updated between blocks of advertisements since the content server 210 presumably will have more time to recompute the target group.

Although the invention has been described in considerable detail with reference to certain preferred embodiments thereof, other embodiments are possible. For example, the content server 210 and billing server 240 may be implemented on a single piece of hardware and/or by a single piece of software code. Similarly, the three databases 260, 280 and 290 may share physical hardware. As another example, any of the databases, particularly programming database 280, may be implemented in a distributed environment of multiple servers, including the use of a peer-to-peer network where programming is stored in other users' computers.

As a final example, functionality and/or data storage may be switched between the client 150 and server 130. For example, the programming database 280 may be accessed by user 150 instead of content provider 130. Alternately, billing information (including credits earned) and/or viewing statistics may be stored at the client 150 rather than the server 130, as is shown in the example of FIGS. 2-5. In another alternate implementation, programming, possibly including different advertising streams, is stored distributed across physical media such as a set of DVDs. Viewing statistics and billing information is also accumulated on physical media, or elsewhere in the system, and periodically processed. For example, the statistics and information might be periodically transmitted to a central server for processing.

What is claimed is:

1. A method for providing interactive advertising to an access device, the method comprising:
    receiving video programming content and advertisements;
    displaying to an access device of a viewer at least a portion of the received video programming content;
    automatically displaying to the access device of the viewer at least one of the received advertisements in addition to the displayed video programming content;
    receiving after a first amount of time a request from the viewer to stop displaying the displayed advertisement;
    responsive to the received request, stopping the display of the advertisement; and
    awarding value to the viewer, the value prorated according to an amount of the advertisement displayed during the first amount of time.

2. The method of claim 1 wherein the received video programming has an associated cost to the viewer, and awarding value to the viewer further comprises crediting the viewer for at least a portion of the cost.

3. The method of claim 1 further comprising:
    automatically displaying to the viewer for a second amount of time a second advertisement in addition to the displayed video programming content and the first advertisement;
    awarding value to the viewer, the value prorated according to an amount of the advertisement displayed during the second amount of time.

4. The method of claim 3 wherein the second advertisement is targeted to the viewer according to the viewer's usage history.

5. The method of claim 4 wherein the viewer's usage history includes data describing which advertisements have previously been skipped by the viewer.

6. The method of claim 3 wherein the second advertisement is targeted to the viewer according to the viewer's demographics.

7. The method of claim 3 further comprising receiving a request from the viewer to stop the display of the second advertisement; and
    responsive to receiving the request, stopping the display of the second advertisement.

8. The method of claim 3 wherein each advertisement has an associated value, and awarding value to the viewer includes awarding the prorated value associated with each advertisement displayed to the viewer.

9. The method of claim 1 wherein the received video programming content is displayed to the viewer in response to a request from the viewer for the content.

10. The method of claim 1 wherein receiving video programming content further comprises receiving a video stream over a network.

11. The method of claim 1 wherein receiving video programming content further comprises receiving a physical medium including the content.

12. The method of claim 11 wherein receiving advertisements further comprises receiving advertisements over a network.

13. The method of claim 1 wherein the value awarded to the viewer depends at least in part on the time of day at which the advertisement is displayed.

14. A method for providing interactive advertising comprising:
    receiving video programming content and advertisements;
    displaying to an access device of a viewer at least a portion of the received video programming content;
    automatically displaying to the access device of the viewer at least one of the received advertisements in addition to the displayed video programming content;
    receiving a skip request from the access device of the viewer;
    responsive to the skip request, stopping the display of the advertisement being displayed to the access device;
    awarding value to the viewer, the awarded value prorated according to an amount of the advertisement displayed; and
    displaying a second of the received advertisements to the viewer.

15. The method of claim 14 wherein the received video programming has an associated cost to the viewer, and awarding value to the viewer further comprises crediting the viewer for at least a portion of the cost.

16. The method of claim 14 further comprising:
    awarding additional value to the viewer, the awarded value prorated according to an amount of the second advertisement displayed.

17. The method of claim 14 wherein receiving video programming content further comprises receiving a video stream over a network.

18. The method of claim 14 wherein receiving video programming content further comprises receiving a physical medium including the content.

19. The method of claim 18 wherein receiving advertisements further comprises receiving advertisements over a network.

20. A system for providing interactive advertising comprising:
- first receiving means for receiving video programming content and advertisements;
- first displaying means, coupled to the first receiving means, for displaying to a viewer at least a portion of the received video programming content;
- second displaying means, coupled to the first displaying means, for automatically displaying to the viewer at least one of the received advertisements in addition to the displayed video programming content;
- second receiving means, coupled to the second displaying means, for receiving after a first amount of time a request from the viewer to stop displaying the displayed advertisement,
- wherein responsive to the received request, the second displaying means is further adapted to stop the display of the advertisement; and
- awarding means, coupled to the second displaying means, adapted to award value to the viewer, the value prorated according to an amount of the advertisement displayed during the first amount of time.

21. A method for providing interactive advertising comprising:
- receiving video programming content and advertisements;
- displaying to an access device of a viewer at least a portion of the received video programming content;
- automatically displaying to the access device of the viewer a plurality of the received advertisements interspersed with the displayed video programming content;
- for each of the displayed advertisements, determining whether a skip request was received during display of the advertisement; and
- awarding value to the viewer according to a number of interspersed advertisements displayed to the access device of the viewer and not skipped, and a number of interspersed advertisements displayed to the access device of the viewer and skipped.

22. The method of claim 21 wherein each advertisement has an associated value and awarding value to the viewer further comprises:
- awarding to the user the value of each advertisement displayed to the access device of the viewer and not skipped;
- prorating the value of each advertisement displayed to the access device of the viewer and skipped according to an amount of the advertisement displayed prior to receiving the skip request; and
- awarding each of the prorated values to the user.

* * * * *